United States Patent Office 3,745,213
Patented July 10, 1973

3,745,213
VAPOR DIFFUSING COMPOSITION AND METHOD OF MAKING THE SAME
Leonard N. Nysted, 617 Rice, Highland Park, Ill. 60035
No Drawing. Continuation-in-part of application Ser. No. 686,769, Nov. 29, 1967. This application July 7, 1969, Ser. No. 839,619
Int. Cl. A01n 17/00; A61k 27/00; C11b 9/00
U.S. Cl. 424—19
17 Claims

ABSTRACT OF THE DISCLOSURE

A vapor diffusing composition consisting essentially of a granulated metallic salt hydrate carrier for adsorbedly holding molecules of a vapor source and a binder holding the granules together, which binder consists essentially of paraffin and polyethylene wax, said binder also providing a molecular sieve to retain the molecules of the vapor allowing the molecules to leave at a prescribed rate. The method includes the steps of heating the paraffin, adding the polyethylene wax to melted paraffin, adding and mixing the granulated carriers, partial dehydration of the granulated carrier by heating, partial cooling of the mixture, and adding the vapor material. Upon further cooling, the mixture solidifies and can be fragmented for compression molding.

CROSS-REFERENCE TO RELATED APPLICATION

This is a continuation-in-part of applicant's patent application Ser. No. 686,769, filed Nov. 29, 1967, entitled, "Vapor Diffusing Composition and Method of Making the Same," which application is now abandoned.

BACKGROUND OF THE INVENTION

This invention relates to an improved vapor diffusing composition for use in confined spaces.

The customary vapor diffusing materials fall into two groups; that is, the liquid or spray materials, and the solid materials. Both the liquid and the solid materials in current usage have a non-uniform vapor producing ability in that when the material is first introduced into a confined space, the material in many instances produces an overwhelming amount of vapor. However, with the passage of time, the material is dissipated. In the case of the solid or block materials, as the block becomes smaller and smaller there is less and less vapor which is diffused into the confined space so that the effectiveness of the material is greatly diminished with its life span.

The present invention provides an improved vapor diffusing composition in which there is a substantially uniform diffusion of vapor over the entire life span of the composition.

The subject method of manufacture of the vapor diffusing composition is such that the composition may be economically and inexpensively manufactured with relatively inexpensive materials.

SUMMARY OF THE INVENTION

The subject invention relates to a solid block vapor diffusing composition in which the composition includes granules of a vapor source carrying material. The vapor source is molecularly adsorbed to the granules and held therein. The block is formed by paraffin and polyethylene wax which aids in binding the granules together. The granules bound together by the paraffin and polyethylene wax are placed in contact with each other within the composition so that there is intermolecular water sharing bonds between the granules. However, the granules are substantially surrounded by the paraffin and polyethylene wax and some of the vapor source is trapped in the paraffin and polyethylene wax. The composition is formed in a block wherein the outer surface is substantially a continuous surface of paraffin and polyethylene wax.

The polyethylene wax and paraffin acts as a molecular sieve in that it allows only a given number of vapor molecules to pass through the paraffin and polyethylene wax, thereby restraining the diffusion of the vapor material. As molecules of vapor material leave the surface of the block, additional molecules of vapor material then move out to the outer periphery of the block. This movement of the vapor material molecules is along the granules in that the molecules move from one granule to another. It is important to note that the vapor material is highly volatile, so that the molecular pressure within the block created by the vapor material is at a rather high level and there is a constant pressure forcing the vapor material molecules out. However, the paraffin and polyethylene wax serves to restrain the diffusion of the molecules, thereby acting as a gate on the outer surface of the block which limits the diffusion rate and keeps the diffusion rate relatively constant.

The method of manufacturing the block includes the steps of heating the paraffin to a temperature of approximately 125° C. and then pellets of polyethylene wax are added to the heated paraffin. A hydrated metal salt granular carrier having a particle size between 100 and 400 mesh is added to the polyethylene wax and paraffin with stirring and the temperature is raised to dehydration temperature for approximately 10 to 15 minutes, or until about one-half of the water of hydration is removed. Thus, the carrier is allowed to dehydrate partially, and then the temperature is adjusted to approximately 110° C. Then, the vapor source material such as, perfume oils, ethylene dichloride, Formalin, paradichlorobenzene, or the like, is added, and the mixture is stirred to distribute the vapor source material uniformly throughout the mixture. The mixture is then cooled to form cakes or blocks. A further step may be made wherein the cakes or blocks may be broken up and the particles are then pressed into any desired shape.

It is one of the principal objects of the instant invention to provide a block vapor diffusing composition, which composition diffuses a vapor substantially uniformly over the life of the block.

It is another object of the present invention to provide a solid vapor diffusing composition wherein the composition includes a plurality of adsorbent granules for holding vapor source material adsorptively attached to the granules and the granules are positioned in an abutting relationship to allow the vapor material molecules to transfer from one granule to the next as the molecules move to the outer surface of the block for diffusion.

It is a still further object of the present invention to provide an improved solid vapor diffusing composition wherein the composition includes a binding material which also acts as a molecular sieve for controlling the rate of diffusion of vapor material.

It is still another object of the herein-disclosed invention to provide an improved method of manufacturing a solid vapor diffusing block wherein the vapor material is adsorptively attached to granules of a holding material.

It is still another object of the present invention to provide a method of manufacturing solid vapor diffusing compositions wherein the compositions may be formed into any convenient or selected form.

It is still another object of the present invention to provide a simple and economical method of manufacturing a solid vapor diffusing composition.

Other objects and uses of this invention will become readily apparent to those skilled in the art upon a perusal of the following specification.

DESCRIPTION OF THE PREFERRED EMBODIMENT

In general, the instant solid block is made in the following manner. 17.5 units by weight of a low molecular weight paraffin is melted at approximately 100° C. The temperature of the paraffin is then raised to approximately 125° C. a quantity of polyethylene wax approximately equal in weight to the paraffin and in the form of small pellets is slowly added to the melted and heated paraffin with stirring so that the polyethylene wax is dissolved in the paraffin. Approximately 50 units by weight of an insoluble stable hydrate of a metal salt in granular form, which grains are between 100 to 400 mesh, are then added to the paraffin and the polyethylene wax with stirring so that the granules are uniformly distributed through the paraffin and the polyethylene wax. The temperature of the mixture is then adjusted until profuse bubbling occurs wherein the water is partially driven off the granules; the mixture is then cooled to a temperature of approximately 110° C. To the cooled mixture is added 15 units by weight of vapor producing material. The mixture is then stirred for a short time to distribute the vapor producing material. The mixture then may be poured into molds and quickly cooled or quickly cooled to form a solid. The solid material may then be crushed or cut into fine particles and the particles then placed into a mold to be pressed into a desired shape.

The following examples will serve to illustrate certain specific compositions and processes of the instant invention but should not limit in body or scope the subject matter of the instant invention.

EXAMPLE 1

17.5 grams of low molecular weight paraffin having a melting point between 45° and 60° C. are heated to 100° C. The melted paraffin is then heated to 150° C. and 17.5 grams of small pellets of Epolene-E–10 (polyethylene wax ca. 2500) are slowly added to the melted paraffin with stirring to disperse the Epolene-E uniformly throughout the melted paraffin. 50 grams of granulated gypsum of a size between 100 and 400 mesh are added to the paraffin and Epolene-E with rapid stirring. The mixture of gypsum, paraffin and Epolene-E is heated to 135° C. and when about one-half of the water of hydration has been lost, which is indicated by bubbling, the mixture is cooled to 110° C. 15 grams of perfume oil are then added with stirring to disperse the perfume oil throughout the mixture. The mixture is then poured into molds and cooled rapidly to minimize the diffusion of perfume oils. After the mixture has been cooled and the Epolene-E and paraffin have solidified, the cakes are removed from the molds and are ready for use. The cake is placed in a room and the regular diffusion of perfume oil serves to mask any undesirable odors such as tobacco smoke and animal odors.

EXAMPLE 2

17.5 grams of low molecular weight paraffin having a melting point between 40° and 90° C. are heated to 100° C. The melted paraffin is then heated to 125° C. and 17.5 grams of small pellets of Epolene-E (polyethylene wax having molecular weight 1400 to 2500) are slowly added to the melted paraffin with stirring to disperse the Epolene-E uniformly throughout the melted paraffin. 50 grams of granulated gypsum of a size between 100 and 400 mesh are added to the paraffin and Epolene-E with stirring. The mixture of gypsum, paraffin and Epolene-E is heated to 135° C. and when about one-half of the water of hydration has been lost, which is indicated by bubbling, the mixture is cooled to 110° C. 15 grams of odorant (3,5,5-trimethyl hexanal) are added to the mixture with stirring to disperse the odorant uniformly throughout the mixture. The mixture is then cooled rapidly to solidify the paraffin and Epolene-E. The solidified composition is then crushed into small particles. 5 grams of Formalin are added to the mixture with stirring. The small particles with the Formalin are pressed into a mold and pressure is applied to the mold to form a cohesive mass. The cohesive mass is then extracted from the mold and the molded cohesive mass is then placed in a confined space such as a room to allow the odorant to diffuse to mask undesirable odors such as tobacco smoke or animal odors.

EXAMPLE 3

26.25 grams of low molecular weight paraffin having a melting point between 40° and 90° C. are heated to 100° C. The melted paraffin is then heated to 150° C. and 8.75 grams of small pellets of Epolene-N–10 (polyethylene wax ca. 2500) are slowly added to the melted paraffin with stirring to disperse the Epolene-N uniformly throughout the melted paraffin. 50 grams of granulated hydrated silica of a size between 100 and 400 mesh is slowly added to the paraffin and Epolene-N with stirring. The mixture of paraffin, Epolene-N and silica is heated until profuse bubbling begins, at which time the mixture is then cooled to 110° C. 15 grams of perfume oil are then added with stirring to disperse the perfume oil throughout the mixture. The mixture is then poured and cooled to allow the mixture to solidify. The solidified mixture is then shaved and the shaved mixture is then placed in a mold and pressure of at least 10 p.s.i. is applied to the mixture to press the mixture into a solid form. The compressed mixture is then removed from the mold and placed in a room. The regular diffusion of perfume oil serves to mask any undesirable odors such as tobacco smoke and animal odors.

EXAMPLE 4

17.5 grams of low molecular weight paraffin having a melting point between 40° and 70° C. are heated to 150° C. to melt the paraffin. To the melted paraffin are added 17.5 grams of small pellets of Epolene-E (polyethylene wax having molecular weight 1400 to 2500). The Epolene-E is added slowly with stirring to disperse the Epolene-E uniformly throughout the melted paraffin. 75 grams of granulated hydrated aluminum oxide of a size between 100 and 400 mesh are added to the paraffin and Epolene-E with rapid stirring. The mixture of paraffin, Epolene-E and hydrated aluminum oxide is heated until profuse boiling begins. The mixture is then cooled to 110° C. To the mixture is added 5 grams of perfume oil with stirring to disperse the perfume oil throughout the mixture. The mixture is then poured into molds. The mixture is then cooled to solidify the Epolene-E and paraffin into cake form. The cakes are removed from the molds and the cakes are cut into fine flakes and the flakes are placed in a second mold and pressure of 50 p.s.i. is applied to the fine flakes to form a cohesive mass. The cohesive mass is then extracted from the mold, and the molded cohesive mass is then placed in a confined space such as a room to allow the perfume oils to diffuse at a regular rate to mask undesirable odors such as tobacco smoke or animal odors.

EXAMPLE 5

17.5 grams of low molecular weight paraffin having a melting point between 40° and 90° C. are heated to 100° C. The melted paraffin is then heated to 125° C. and an equal quantity by weight of small pellets of Epolene-E (polyethylene wax having molecular weight 1400 to 2500) is slowly added to the melted paraffin with stirring to disperse the Epolene-E uniformly throughout the melted paraffin. 50 grams of granulated hydrated magnesium sulfate of a size between 100 and 400 mesh are added to the paraffin and Epolene-E with rapid stirring. The mixture of paraffin, Epolene-E and hydrated magnesium sulfate is heated until profuse boiling begins, indicating that about one-half of the water of hydration has been removed. The mixture is then cooled to 125° C. 15 grams of perfume oils are then added with stirring to disperse the perfume oils throughout the mixture. The mixture is then poured onto a flat surface and cooled rapidly to minimize diffusion of the perfume oil. After the mixture has been cooled and the Epolene-E and paraffin have solidified, the solids are then crushed into small particles and the small particles are placed into a mold. A pressure of 500 p.s.i. is applied to the mold to form a cohesive mass and the cohesive mass is then extracted from the mold. The molded cohesive mass is placed in a confined space such as a room to allow the perfume oils to diffuse to mask undesirable odors.

EXAMPLE 6

17.5 grams of low molecular weight paraffin having a melting point between 40° and 90° C. are heated to 100° C. The melted paraffin is then heated to 125° C. and 17.5 grams of small pellets of Epolene-E (polyethylene wax having molecular weight 1400 to 2500) are added slowly to the melted paraffin with stirring to disperse the Epolene-E uniformly throughout the melted paraffin. 50 grams of granulated hydrated copper sulfate of a size betwen 100 and 400 mesh are added to the paraffin and Epolene-E with stirring. The mixture of paraffin, Epolene-E and copper sulfate is heated until profuse boiling begins. Then the mixture is cooled to 110° C. 15 grams of perfume oils are then added with stirring to disperse the perfume oils throughout the mixture. 5 grams of paradichlorobenzene are added with stirring to disperse the paradichlorobenzene throughout the mixture. The mixture is then poured onto a plate and cooled rapidly to solidify the Epolene-E and paraffin and to minimize diffusion of the perfume oils and paradichlorobenzene. The solidified composition is then crushed into small particles and the small particles are placed into a mold. Pressure in excess of 10 p.s.i. is applied to the fine particles to form a cohesive mass. The cohesive mass is extracted from the mold and the molded cohesive mass is then placed in a closet or other confined space to allow the perfume oils and paradichlorobenzene to diffuse and mask undesirable odors and to retard growth of undesirable microorganisms.

EXAMPLE 7

17.5 grams of low molecular weight paraffin having a melting point between 40° and 90° C. are heated to 100° C. The melted paraffin is then heated to 125° C. and 17.5 grams of small pellets of Epolene-E (polyethylene wax having molecular weight 1400 to 2500) are slowly added to the melted paraffin with stirirng to disperse the Epolene-E uniformly throughout the melted paraffin. 50 grams of granulated zinc sulfate hexahydrate of a size between 100 and 400 mesh are added to the paraffin and Epolene-E with stirring. The mixture of paraffin, Epolene-E and zinc sulfate hexahydrate is heated until profuse boiling begins. The mixture is then cooled to 110° C. 15 grams of perfume oils are then added with stirring to disperse the perfume oils throughout the mixture. The mixture is then poured into molds and cooled rapidly to solidify the Epolene-E and paraffin and to minimize diffusion of the perfume oils. The material in the molds forms cakes and the cakes are removed from the mold for use. A cake is placed in a room and the regular diffusion of perfume oils serves to mask any undesirable odors such as tobacco smoke and animal odors.

EXAMPLE 8

17.5 grams of a low molecular weight paraffin having a melting point between 40° and 90° C., 17.5 grams of Epolene-E and 50 grams of gypsum in granular form having grains which are between 100 and 400 mesh are mixed and milled to a homogeneous state on a mill. The mixture is then tumbled while 15 grams of perfume oil are added to the mixture. After uniform mixing of the perfume oil is achieved, the mixture is compressed into tablets. The tablets are then placed in a confined space, such as a room, to allow the perfume oil to diffuse to mask undesirable odors such as tobacco smoke and animal odors.

EXAMPLE 9

17.5 grams of a low molecular weight paraffin having a melting point between 40° and 90° C., 17.5 grams of Epolene-E (polyethylene wax having molecular weight 1400 to 2500) and 50 grams of gypsum in granular form having grains which are between 100 and 400 mesh are mixed and milled to a homogeneous state on a mill. The mixture is then tumbled while 25 grams of perfume oil are added along with 5 grams of Formalin. After uniform mixing of the perfume oil and Formalin is achieved, the mixture is compressed into tablets. The tablets are then placed in a confined space, such as a room, to allow the perfume oil to diffuse to mask undesirable odors such as tobacco smoke and animal odors.

EXAMPLE 10

17.5 grams of a low molecular weight paraffn having a melting point beteenn 40° and 90° C., 17.5 grams of Epolene-E (polyethylene wax having molecular weight 1400 to 2500) and 50 grams of gypsum in granular form having grains which are between 100 and 400 mesh are mixed and milled to a homogeneous state on a mill. The mixture is then tumbled while 25 grams of methylene chloride are added to the mixture. After uniform mixing of the methylene chloride is achieved, the mixture is compresed into tablets. The tablets are then placed in a confined space such as a clothing bag or storage box to retard growth of microorganisms and to kill insects.

EXAMPLE 11

17.5 grams of low molecular weight paraffin having a melting point between 40° and 90° C. are heated to 100° C. The melted paraffin is then heated to 150° C. and small pellets of Epolene-N (polyethylene wax having molecular weight 1500 to 2500) are slowly added to the melted paraffin with stirring to disperse the Epolene-N uniformly throughout the melted paraffin. 40 grams of granulated hydrated silica of a size between 100 and 400 mesh are slowly added to the paraffin and Epolene-N with stirring. The mixture of paraffin, Epolene-N and silica is heated until profuse bubbling begins. After the profuse bubbling begins, the mixture is cooled to 110° C. 15 grams of methylene chloride are then added with stirring to disperse the methylene chloride throughout the mixture. The mixture is then poured and cooled to allow the mixture to solidify. The solidified mixture is then ground and the ground mixture is then placed in a mold and pressure of at least 10 p.s.i. is applied to the mixture to press the mixture into a solid form. The compressed mixture is then removed from the mold and placed in a confined space such as a closet or storage container to release slowly a fumigant.

In all of the foregoing example compositions, the paraffin and the polyethylene wax coact to provide a molecular sieve which acts as a gate to control the rate of diffusion of vapor from the solid block. It has been found that the combination of paraffin and polyethylene wax is also necessary in order to produce desirable mechanical properties of the block. When polyethylene wax is used without paraffin, the resulting block is one which easily cracks and shatters, while a block which is made of paraffin without polyethylene wax is too soft. Thus, the combination of polyethylene wax and paraffin provides a block having mechanical properties in which the block is not too soft nor does it readily shatter and crack. Thereby, the balance of paraffin and polyethylene wax performs a dual function of providing improved mechanical properties as well as providing a means for controlling the rate of vapor diffusion.

In Examples 1 through 7 and 11, it may be seen that the mixture of paraffin, polyethylene wax and hydrated insoluble stable metal salt carrier is heated. This heating of the mixture raises the temperature of the mixture to a temperature above the dehydration temperature of the hydrated metal salt. The profuse bubbling which occurs is generated by the water which is driven off the metal salt carrier so that the metal salt carrier is partially dehydrated. With the partial dehydration of the carrier, a water sharing matrix is formed to which the molecules of the vapor material more readily attach themselves and the carrier provides an improved path for the vapor to follow to the outer surface of the block. In the remainder of the examples, this step is not taken so that the metal salt remains hydrated. However, the carrier is still operative although not with the same efficiency as the partially dehydrated metal salt carrier. Thus, there is a substantial advantage to partially dehydrating the metal salt carrier.

Inasmuch as the vapor source material is added while the mixture of paraffin, polyethylene wax and carrier is hot, and the vapor source material is quite volatile, in some instances, it is desirable to add the vapor source material in a closed regenerative chamber. In instances where Formalin is used, safety dictates that the Formalin be added in a closed chamber to protect the workers. However, it should be appreciated that Formalin or other highly volatile material may be added to the mixture when the mixture is hot by making the addition in a vented hood under laboratory conditions. However, in commercial practice, it is more desirable to use an enclosed chamber with a condenser.

In order to reduce the loss of volatile materials, in certain examples it is shown how the polyethylene wax, paraffin and carrier may be mixed and then the volatile vapor source materials are added to a cooled and crushed mixture. After the vapor source materials are thoroughly blended, the blended mixture is then placed in a mold and pressure is applied to compress the materials into a solid block. Even with the formation of the blocks by pressure, the paraffin and polyethylene wax provide a molecular sieve to control the rate of vapor diffusion.

Although specific embodiments of the present invention have been described in detail herein and specific mixtures, temperatures and pressures have been set forth in the examples above, it is to be expressly understood that the instant invention is in no way limited by the examples herein which are presented solely for purposes of illustration, but rather, the invention is limited only by the appended claims.

What is claimed is:

1. A solid deodorant composition block consisting essentially of 1.75 parts by weight of paraffin, 1.75 parts by weight of polyethylene wax having a molecular weight 1400 to 2500 homogeneous with the paraffin, 5 parts by weight of pulverized, partially dehydrated gypsum having a particle size between 100 and 400 mesh uniformly distributed through the paraffin and polyethylene wax wherein adjacent particles of gypsum contact each other and are held in position by the paraffin and polyethylene wax and 1.5 parts of perfume oil uniformly distributed through the gypsum and paraffin and polyethylene wax, whereby the paraffin and polyethylene wax provide a molecular sieve to restrict the diffusion of the perfume oil.

2. A solid deodorant composition block consisting essentially of paraffin, a low density polyethylene wax having a molecular weight 1400 to 2500 equal in amount by weight to the paraffin, said paraffin and polyethylene wax uniformly distributed throughout the block, an insoluble stable granular metallic salt hydrate initially of particle size 100-400 mesh which remains stable under ordinary conditions but which decomposes upon heating, said metallic salt hydrate uniformly distributed throughout the block and present in sufficient quantity to provide contact between adjacent particles of the salt, wherein the salt particles are bonded together by water sharing bonds to form a matrix within the block, and a perfume oil uniformly distributed throughout the block whereby the paraffin and the polyethylene wax provide a molecular sieve to allow uniform diffusion of the perfume oil from the outer surface of the block.

3. A solid composition block for providing a source of vapors delivered at a relatively uniform rate comprising a low molecular weight paraffin, a low density polyethylene wax homogenous with the paraffin, an insoluble stable granular metallic salt hydrate carrier initially of particle size 100-400 mesh which remains stable under ordinary conditions but which decomposes upon heating, said metallic salt hydrate carrier uniformly distributed throughout the paraffin and polyethylene wax, and means for producing a vapor uniformly distributed throughout the paraffin, polyethylene wax and carrier, whereby the carrier provides a path for molecules of vapor to travel from the interior of the block to the outer surface and the paraffin and polyethylene wax provide a molecular sieve to regulate the diffusion of the vapor molecules for uniform diffusion of vapor from the outer surface of the block.

4. A solid composition block for providing a source of vapor delivered at a relatively uniform rate comprising 1 part to 9 parts by weight of low molecular weight paraffin, 1 part to 9 parts by weight of polyethylene wax homogenous with the paraffin, 1.5 parts to 22.5 parts by weight of an insoluble stable granular metallic salt hydrate carrier initially of particle size 100-400 mesh which remains stable under ordinary conditions but which decomposes upon heating, said metallic salt hydrate carrier uniformly distributed throughout the paraffin and polyethylene wax, 1.5 parts to 9 parts by weight of means for producing a vapor uniformly distributed throughout the paraffin, polyethylene wax and carrier, whereby the carrier provides a path for molecules of vapor to travel from the interior of the block to the outer surface and the paraffin and polyethylene wax provide a molecular sieve to regulate the diffusion of vapor molecules for uniform diffusion of vapor from the outer surface of the block.

5. A solid composition block for providing a source of vapor delivered at a relatively uniform rate as defined in claim 4, wherein the amount of polyethylene wax is substantially equal to the amount of paraffin.

6. A solid composition block for providing a source of vapor delivered at a relatively uniform rate as defined in claim 5, wherein the paraffin has a melting point between 45° and 60° C.

7. A solid composition for providing a source of vapor delivered at a relatively uniform rate as defined in claim 4, wherein the metallic salt hydrate carrier is partially dehydrated gypsum.

8. A solid composition block for providing a source of vapor delivered at a relatively uniform rate as defined in claim 4, wherein the means for producing a vapor is perfume oils.

9. A solid composition block for providing a source of vapor delivered at a relatively uniform rate as defined in claim 4, wherein the means for producing a vapor is selected from one of the following: perfume oils, methylene chloride, Formalin and paradichlorobenzene.

10. A solid composition block for providing a source of vapor delivered at a relatively uniform rate as defined in claim 4, wherein the carrier is a partially dehydrated insoluble stable metal salt having a particle size between 100 and 400 mesh selected from one of the following: gypsum, hydrated silica, hydrated aluminum oxide and hydrated magnesium sulfate.

11. The method of manufacturing a solid deodorant block comprising the steps of: melting a low molecular paraffin; adding small pellets of polyethylene wax to the paraffin to distribute the polyethylene wax uniformly with the paraffin; adding pulverized gypsum of particle size 100-400 mesh to the paraffin and polyethylene wax; stirring the gypsum, paraffin and polyethylene wax to distribute the gypsum uniformly throughout the paraffin and polyethylene wax; heating the mixture of paraffin, polyethylene wax and gypsum above the dehydrating temperature of gypsum; cooling the gypsum, paraffin and polyethylene wax to a temperature of less than 125° C.; adding perfume oil to the gypsum, polyethylene wax and paraffin; stirring the perfume oil, gypsum, polyethylene wax and paraffin to distribute the perfume oil; and cooling the perfume oil, gypsum, polyethylene wax and paraffin to form a solid homogeneous mass.

12. The method of manufacturing a solid composition block for providing a source of vapor delivered at a relatively uniform rate as defined in claim 11, including the steps of; fragmenting the solid mass to a small particle size; placing the small particles in molds; applying a pressure of at least 10 p.s.i to the particles of the mold to form solid cakes of material; and extracting the cakes of material from the mold.

13. The method of manufacturing a solid composition block for providing a source of vapor delivered at a relatively uniform rate as defined in claim 12, wherein the pressure applied to cohere the mixture is 50 p.s.i. or greater.

14. The method of manufacturing a solid composition block for providing a source of vapor delivered at a relatively uniform rate comprising the steps of: melting a low molecular weight paraffin; adding small pellets of polyethylene wax to the paraffin to melt and to distribute the polyethylene wax uniformly throughout the paraffin; adding a pulverized insoluble stable granular metallic salt hydrate carrier having a particle size between 100–400 mesh to the paraffin and polyethylene wax; stirring the paraffin polyethylene wax and carier to distribute the carrier uniformly throughout the paraffin and polyethylene wax; heating the mixture of paraffin, polyethylene wax and carrier to a temperature above the dehydrating temperature of the carrier; cooling the carrier, paraffin and polyethylene wax to a temperature of less than 125° C.; adding a vapor source to the mixture of carrier, polyethylene wax and paraffin; stirring the vapor source, carrier, polyethylene wax and paraffin to distribute the vapor source uniformly throughout the mixture; and cooling the vapor source material, carrier, polyethylene wax and paraffin to form a solid homogeneous mass.

15. The method of making a solid composition block comprising the steps of: homogenizing a low density polyethylene wax, a low molecular weight paraffin and a granular insoluble stable metallic salt hydrate carrier having a size between 100–400 mesh; mixing means for producing a vapor uniformly throughout the paraffin, polyethylene and carrier; and forming into blocks the mixture of paraffin, low density polyethylene wax, carrier and means for producing a vapor.

16. The method of manufacturing a solid composition block for providing a source of vapor delivered at a relatively uniform rate as defined in claim 15, wherein the forming of the blocks includes the steps of; placing the mixture of paraffin, low density polyethylene, carrier and means for producing a vapor in a mold and apply a pressure of at least 10 p.s.i. to the mixture to solidify the mixture.

17. The method of manufacturing a solid composition block comprising the steps of: melting a low molecular paraffin; adding small pellets of polyethylene wax to the paraffin to melt the polyethylene wax and to mix the polyethylene wax uniformly with the paraffin; mixing a pulverized insoluble stable metallic salt hydrate carrier having a granular size between 100–400 mesh to distribute the carrier uniformly throughout the paraffin and polyethylene wax; heating the mixture of paraffin, polyethylene wax and carrier to drive off water from the metallic salt hydrate carrier; cooling the paraffin, polyethylene wax and carrier to solidify the mixture, fragmenting the paraffin, polyethylene wax and carrier to flakes; adding means for producing a vapor to the flakes of paraffin, polyethylene wax and carrier; mixing the paraffin, polyethylene wax and carrier and the means for producing a vapor to distribute the means for producing a vapor uniformly throughout the flakes; placing the means for producing a vapor and flakes of paraffin, polyethylene wax and carrier in a mold; applying a pressure to the mold to form the flakes and means for producing a vapor into solid blocks; and extracting the solid blocks from the mold.

References Cited

UNITED STATES PATENTS

| | | | |
|---|---|---|---|
| 2,865,806 | 12/1958 | Bulloff | 424—76 |
| 2,927,055 | 3/1960 | Lanzet | 424—76 |
| 3,371,984 | 3/1968 | Kelly et al. | 424—76 |
| 3,375,159 | 3/1968 | Batton | 424—76 |
| 3,446,893 | 5/1969 | Hanford et al. | 424—76 |

SAM ROSEN, Primary Examiner

U.S. Cl. X.R.

424—76; 252—522